No. 704,902. Patented July 15, 1902.
A. MORTEN.
MOISTURE PROOF CIGAR BOX.
(Application filed Apr. 23, 1902.)
(No Model.)
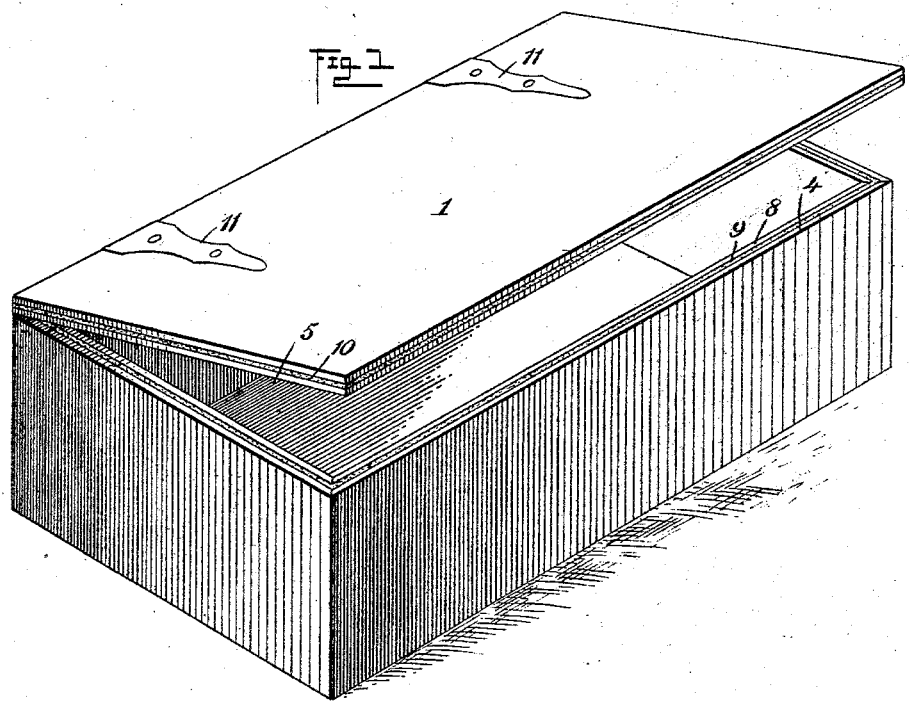
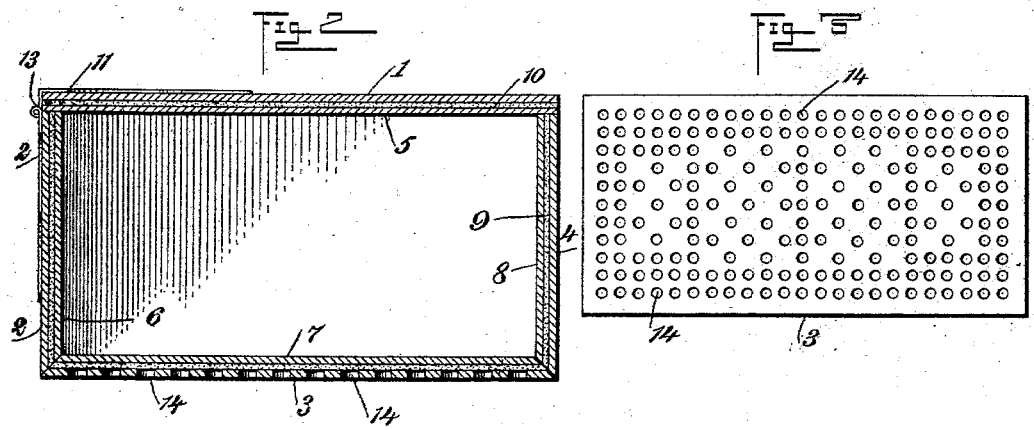
WITNESSES:
INVENTOR
Alexander Morten
BY
ATTORNEYS.

UNITED STATES PATENT OFFICE.

ALEXANDER MORTEN, OF NEW YORK, N. Y.

MOISTURE-PROOF CIGAR-BOX.

SPECIFICATION forming part of Letters Patent No. 704,902, dated July 15, 1902.

Application filed April 23, 1902. Serial No. 104,283. (No model.)

*To all whom it may concern:*

Be it known that I, ALEXANDER MORTEN, a citizen of Great Britain, and a resident of the city of New York, borough of Manhattan, in the county and State of New York, have invented new and useful Improvements in Moisture-Proof Cigar-Boxes, of which the following is a full, clear, and exact description.

My invention relates to boxes for cigars and analogous goods, the object being to preserve the same, so that they will always be fresh and retain their flavor, together with a proper amount of moisture.

Reference is to be had to the accompanying drawings, forming a part of this specification, in which similar characters of reference indicate corresponding parts in all the figures.

Figure 1 is a perspective view of a cigar-box made in accordance with my invention. Fig. 2 is a vertical cross-section through the same, and Fig. 3 represents the outer layer of the bottom of the box.

The box comprises flat members 1 2 3 4, made of any coarse-grained wood, such as oak, the member 3, located in the bottom of the box, being perforated, as shown. Flat members 5 6 7 8 are disposed, as shown, inside of the flat members 1 2 3 4. A layer of felt or some analogous substance 9 is disposed between the inner and outer flat members in the box proper, a similar layer 10 being disposed in the top of the box, as indicated more particularly in Fig. 2.

Hinge members 11 12 are pivoted together at 13, so as to allow the lid of the box to have freedom of movement. The perforations 14 in the bottom member 3 of the box are for the purpose of admitting air and for excluding moisture exceeding a certain proper amount.

The box above described has been produced after a series of exhaustive experiments, which have proven that the theory of keeping cigars in air-tight boxes or receptacles is not only unsound, but positively injurious in its effect on the cigars.

It should be borne in mind that the leaf of the tobacco-plant has a property somewhat similar to that of the so-called "live-oak" and various kinds of willow. It lives, in the true sense of the word, after being cut down and stored after long periods of time. The leaf of the tobacco-plant is not dead when rolled into cigars. It still lives and retains its property of breathing. If it is confined in an absolutely air-tight receptacle, it absorbs the oxygen and then dies. When the leaf dies, it loses its aroma, flavor, and strength. Cigars made of tobacco-leaves must be alive in order to afford good smoking. On the other hand, too much moisture will kill the tobacco-leaf. It is moisture, and especially the uneven moisture resulting from sharp changes in humidity, which ruins cigars. If, therefore, a means can be devised of excluding this moisture and at the same time of not excluding the air, the problem of keeping the cigars in the very best condition is solved. I have solved this problem by producing the box above described. The flat members 5 6 7 8 are made of cedar-wood, which is just porous enough to admit the proper amount of moisture and no more. I find that the best results are attained with an inner lining of cedar-wood, an outer lining of oak, rosewood, and mahogany, and an intermediate layer of felt sandwiched between the inner and outer linings. With the box made as above described the perforations 14 are highly essential. The idea, as above stated, is not to make the box air-tight nor to allow too free ingress or egress of the air, but to admit only a certain amount of air and to exclude all moisture except that already in the cigars and in the air of the box when closed. When air is inclosed in a box such as described above, cigars may be preserved indefinitely and kept practically as sweet and as fresh as when first made.

Having thus described my invention, I claim as new and desire to secure by Letters Patent—

A box for cigars and the like, comprising an outer lining of wood provided with a perforated bottom, a layer of fibrous material adjacent to said outer lining, and an inner lining of porous wood, said box being provided with a flat top consisting of upper and lower layers of porous wood between which is sandwiched a layer of fibrous material, the arrangement being such that the perforations of the bottom layer of the bottom of said box
5 tend to compensate for the want of circulation of air through the bottom of the box due to the box resting upon an object.

In testimony whereof I have signed my name to this specification in the presence of two subscribing witnesses.

ALEXANDER MORTEN.

Witnesses:
 M. J. HEALY,
 NATHAN H. FROST.